United States Patent
Kemper

[11] Patent Number: 5,984,071
[45] Date of Patent: Nov. 16, 1999

[54] CONTROLLED FORCE ACTUATOR SYSTEM

[76] Inventor: Yves J. Kemper, 25 Av. Juste Olivier, 1006 Lausanne, Switzerland

[21] Appl. No.: 08/888,832

[22] Filed: Jul. 7, 1997

Related U.S. Application Data

[60] Provisional application No. 60/021,663, Jul. 12, 1996.
[51] Int. Cl.⁶ .................................................. B60G 11/00
[52] U.S. Cl. ......................................................... 192/89.22
[58] Field of Search .................................... 267/161, 162; 192/89.22, 89.23, 89.24, 89.25, 89.27, 119 A, 70.25; 188/166, 167

[56] References Cited

U.S. PATENT DOCUMENTS

| | | |
|---|---|---|
| 3,323,624 | 6/1967 | Maurice . |
| 3,868,100 | 2/1975 | Maucher . |
| 4,602,708 | 7/1986 | Nagano . |
| 4,623,055 | 11/1986 | Ohkubo . |
| 4,696,384 | 9/1987 | Huber . |
| 4,949,829 | 8/1990 | Tojima et al. . |
| 5,088,583 | 2/1992 | Takeuchi et al. . |
| 5,148,904 | 9/1992 | Takashi et al. . |
| 5,236,070 | 8/1993 | Simoncic et al. . |
| 5,400,887 | 3/1995 | Mizukami et al. . |
| 5,409,091 | 4/1995 | Reik et al. . |
| 5,551,547 | 9/1996 | Mizukami et al. . |
| 5,579,881 | 12/1996 | Weidinger . |
| 5,715,920 | 2/1998 | Lindner et al. ....................... 192/70.25 |
| 5,730,267 | 3/1998 | Lopez .................................... 192/70.27 |
| 5,741,199 | 4/1998 | Tanser et al. ........................... 475/235 |
| 5,794,753 | 8/1998 | Kemper ................................. 192/89.25 |
| 5,855,267 | 1/1999 | Giroire et al. ......................... 192/70.27 |
| 5,887,691 | 5/1999 | Kemper ................................. 192/89.22 |

FOREIGN PATENT DOCUMENTS

| | | |
|---|---|---|
| 0 718 517 A1 | 6/1996 | European Pat. Off. . |
| 40 02 648 A1 | 8/1990 | Germany . |
| 2 287 994A | 4/1995 | United Kingdom . |

OTHER PUBLICATIONS

Dr.–Ing. Wolfgang Reik, "The Self–Adjusting Clutch––SAC," LuK Drive Train Systems, Comfort and Economy, May 27, 1994.

*Primary Examiner*—Robert J. Oberleitner
*Assistant Examiner*—Melanie Talavera
*Attorney, Agent, or Firm*—Finnegan, Henderson, Farabow, Garrett, & Dunner, LLP

[57] ABSTRACT

A controlled force actuating system to apply and release an actuating force between a load member and a reaction member and includes an energy storing positive spring and an energy storing negative Belleville spring arranged in series between the load member and the reaction member to exert a range of actuating force on the load member varying between minimum and maximum values. The positive spring has a length and a positive force/deflection ratio. The negative Belleville spring has a length and a negative force/deflection ratio related to the positive force/deflection ratio so that the positive spring and the negative Belleville spring may reach a state of equilibrium substantially throughout the range of actuating force. The positive spring and the negative Belleville spring present a total length including both the axial lengths of the respective springs. A mechanism is provided for varying the total length of the springs for controlling the actuating force while maintaining the springs substantially in a state of equilibrium throughout the actuating force range between the minimum and maximum values.

18 Claims, 12 Drawing Sheets

CONTROLLED FORCE ACTUATOR SYSTEM

This application claims the benefit of U.S. Provisional Application entitled CONTROLLED FORCE ACTUATOR SYSTEM, Ser. No. 60/021,663, filed Jul. 12, 1996, the disclosure of which is incorporated by reference.

BACKGROUND OF THE INVENTION

This invention relates to controlled force actuating systems and more particularly, to an actuating system in which an actuating force is supplied by controlled release of a loaded spring. The actuating system is particularly applicable to the development of normal forces for friction devices such as power transmitting clutches but is also useful in other applications.

Automotive power transmitting or starting clutches represent one of the more challenging applications of controlled force actuating systems in which a relatively large amount of energy stored in a spring must be controlled during release and restored to the spring. Such clutches employ frictionally engaged torque transmitting components which operate at a torque capacity essentially proportional to an axial clamping force applied by an actuating spring. The force of the actuating spring is modulated such that transmitted torque may be controlled reversibly between minimum and maximum values. Traditionally, the relatively large force actuating springs of automotive clutches have been operated by control systems involving levers, ball ramps or other force reduction devices by which the actuating spring may be controlled by a foot pedal, an electric motor, or hydraulic actuators, for example.

The conventional control systems for automotive starting clutches are not only complex and space consuming, but also, they are not suited to automation because of the large amounts of energy required for their operation. In this latter respect, the development of on-board computers in automotive vehicles has given rise to much interest in automating the operating of starting clutches and the power transmissions with which they are used. In spite of many recent attempts to accomplish such automation, the energy requirements to retract and control the release of the clutch spring have been a major obstacle.

Hence, there is an acute need for a controlled force actuating system by which a large spring force can be exerted but which can be operated by a relatively small amount of control energy. This need exists not only in automatic clutch applications, but also in numerous other applications where a force must be applied between action and reaction members, under control through a range of from minimum to maximum force values, as in rotatable or linear friction brakes, clutch packs for automatic transmissions, autoclaves, all given as limited examples only.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the controlled force actuating system of the invention operates to apply and release an actuating force between a load member and a reaction member and includes an energy storing positive spring and an energy storing negative Belleville spring arranged in series between the load member and the reaction member to exert a range of actuating force on the load member varying between minimum and maximum values. The positive spring has a length and/or a pseudo length and a positive force/deflection ratio. The negative Belleville spring has a length and/or a pseudo length and a negative force/deflection ratio related to the positive force/deflection ratio so that the positive spring and the negative Belleville spring may reach a state of equilibrium substantially throughout the range of actuating force. The positive spring and the negative Belleville spring present a total length and/or a composite pseudo length including both the axial lengths and/or pseudo lengths of the respective springs. A mechanism is provided for varying the total or composite pseudo lengths of the springs for controlling the actuating force while maintaining the springs substantially in a state of equilibrium throughout the actuating force range between the minimum and maximum values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
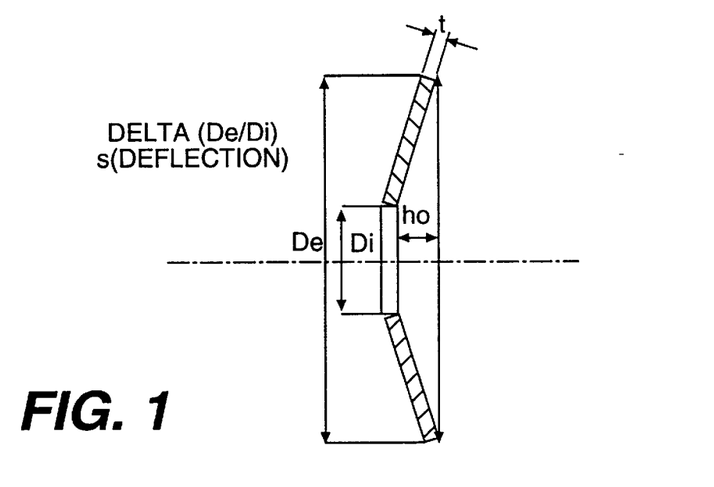
FIG. 1 is a cross-section illustrating dimensional parameters of a Belleville spring.

Because the operation of the actuating system of the invention is dependent largely on the characteristics of a negative Belleville spring, reference is first made to FIG. 1 in which the dimensions of a typical Belleville spring Bs are indicated to include an outside diameter DE, an inside diameter DI, a thickness t, and a conical height ho. These dimensions will determine the operating characteristics of a Belleville spring for a given spring material and are used in the design of a Belleville spring.

Figure 2:
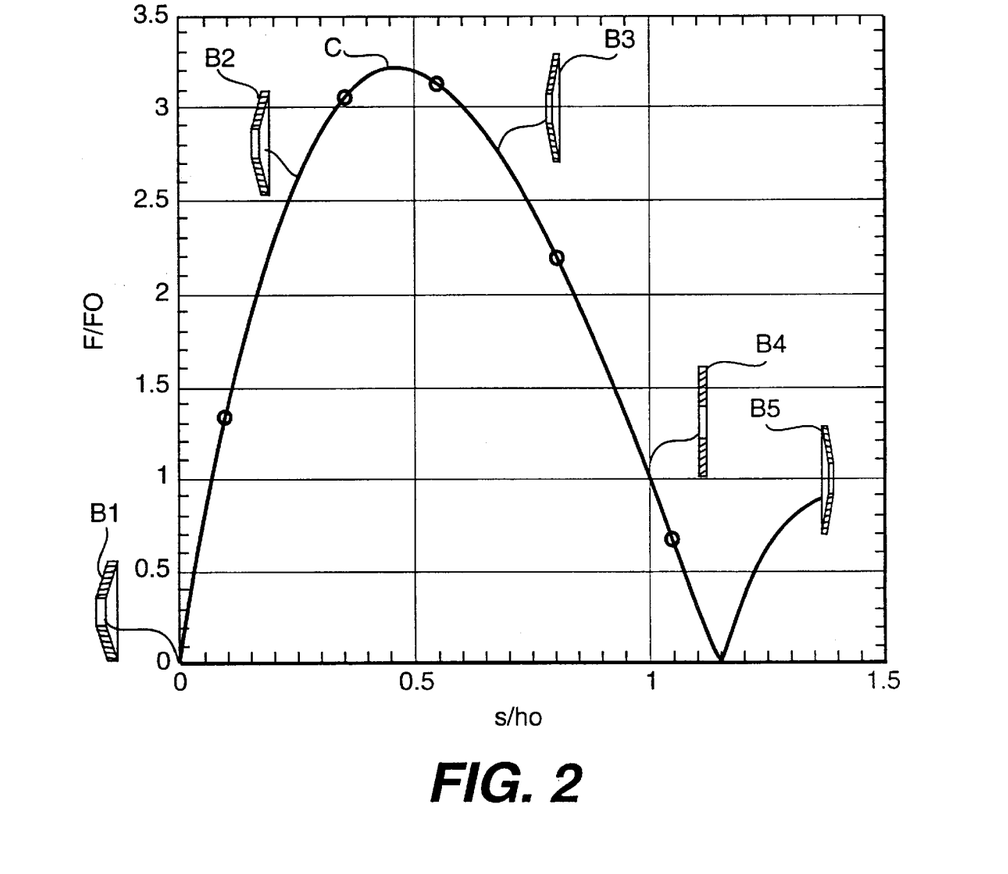
FIG. 2 is a graph illustrating force versus deflection characteristics of a Belleville spring used in the actuation system of the present invention.

An example of the force deflection characteristics of a Belleville spring are illustrated in FIG. 2. In particular, relative units of force are given on the ordinate of the curve C in FIG. 2 whereas relative units of deflection are indicated on the abscissa. In a state of rest, the Belleville spring will be in the condition illustrated in FIG. 1, for example. This state is also illustrated by an icon B1 in FIG. 2 when relative force F/Fo=0 and relative deflection s/ho=0. If an axial force F is applied to the Belleville spring, a deflection s in an axial direction will occur, as represented by the reduced height of the icon B2, but with the applied force F increasing to a maximum Fo, as illustrated on the side of the curve C shown in FIG. 2 to the left of the top of the curve C representing a deflection s/ho of approximately 0.45 in the illustrated example. With continued deflection, depicted by the icons B3, B4 and B5, the applied force begins to reduce after reaching the maximum, and diminishes on the side of the curve C to the right of the top of the curve C, down to zero. In this deflection process, it will be noted that by definition, when s/h0=1, the configuration of the Belleville spring is flattened, as represented by the icon B4. Also, after passing the flat configuration, the applied force is further reduced along the curve C to zero, and at maximum deflection, is inverted or cocked as depicted by the icon B5.

The term "negative Belleville spring" is used herein and in the appended claims to designate a Belleville spring that is initially loaded with energy and that operates on the right side of the curve C in the example of FIG. 2. In this respect, the negative Belleville spring has a negative force/deflection ratio in that the force it exerts decreases with increased deflection.

The term "positive spring," as used herein and in the appended claims, is exemplified by a Belleville spring that operates along the left side of the curve C shown in the example of FIG. 2. In this respect, the positive Belleville spring has a positive force/deflection ratio in that the force it exerts increases with increased deflection. Such a "positive spring" may embodied as other types of springs which have a positive force/deflection ratio, such as a conventional coil spring. Also, the positive spring of the invention may be a composite of a spring unit, such as a positive Belleville spring, and other positive spring components of the device in which the actuator of the invention is used. For example, in a conventional automotive clutch, elasticity in the clutch disc or in the back plate that provides a reaction to clutch actuating force, may combine with a supplied positive spring unit to provide the "positive spring."

In accordance with the present invention, a force actuator system is provided to apply and release an actuating force between a load member and a reaction member. Although the actuating system is thus broadly applicable, it will be described herein principally as an actuating system for use in an automotive starting clutch.

In FIGS. 3–7, an automotive clutch organization is generally designated by the reference numeral 10 and illustrated as including such conventional components as a flywheel 12, a clutch disc 14 having friction linings on opposite sides thereof, a pressure plate 16, and a back plate 18. The back plate 18 is fixed to the flywheel 12 for rotation therewith and against axial displacement with respect to the flywheel 12 as is well known in the art. Also, the pressure plate 16 is connected to rotate with the flywheel, or alternatively with the back plate, by springs or straps (not shown), which allow a limited axial movement of the pressure plate and which apply an axial force tending to pull the pressure plate axially away from the flywheel. Input power is supplied to the clutch 10 through the flywheel 12. Output power is delivered from the clutch 10 through an output portion 20 of the clutch disc 14, when the clutch is closed or engaged by contact under normal force loading of the friction linings on the clutch disc 14 between the flywheel 12 and the pressure plate 16 under normal force loading, to an appropriate output shaft (not shown). In FIGS. 3–7, only half-sections of components are shown. In practice all illustrated components are symmetrical about and rotatable on a central axis 22.

In accordance with the invention, the automotive clutch 10 is equipped with a controlled force actuating system including an energy storing positive spring and an energy storing negative Belleville spring arranged in series between the load member and the reaction member to exert a range of actuating force on the load member varying between minimum and maximum values, the positive spring having a length and a positive force/deflection ratio and the negative Belleville spring having a length and a negative force/deflection ratio. The series arrangement of the springs present a total length including both the axial lengths of the respective positive and negative springs.

Figure 3:
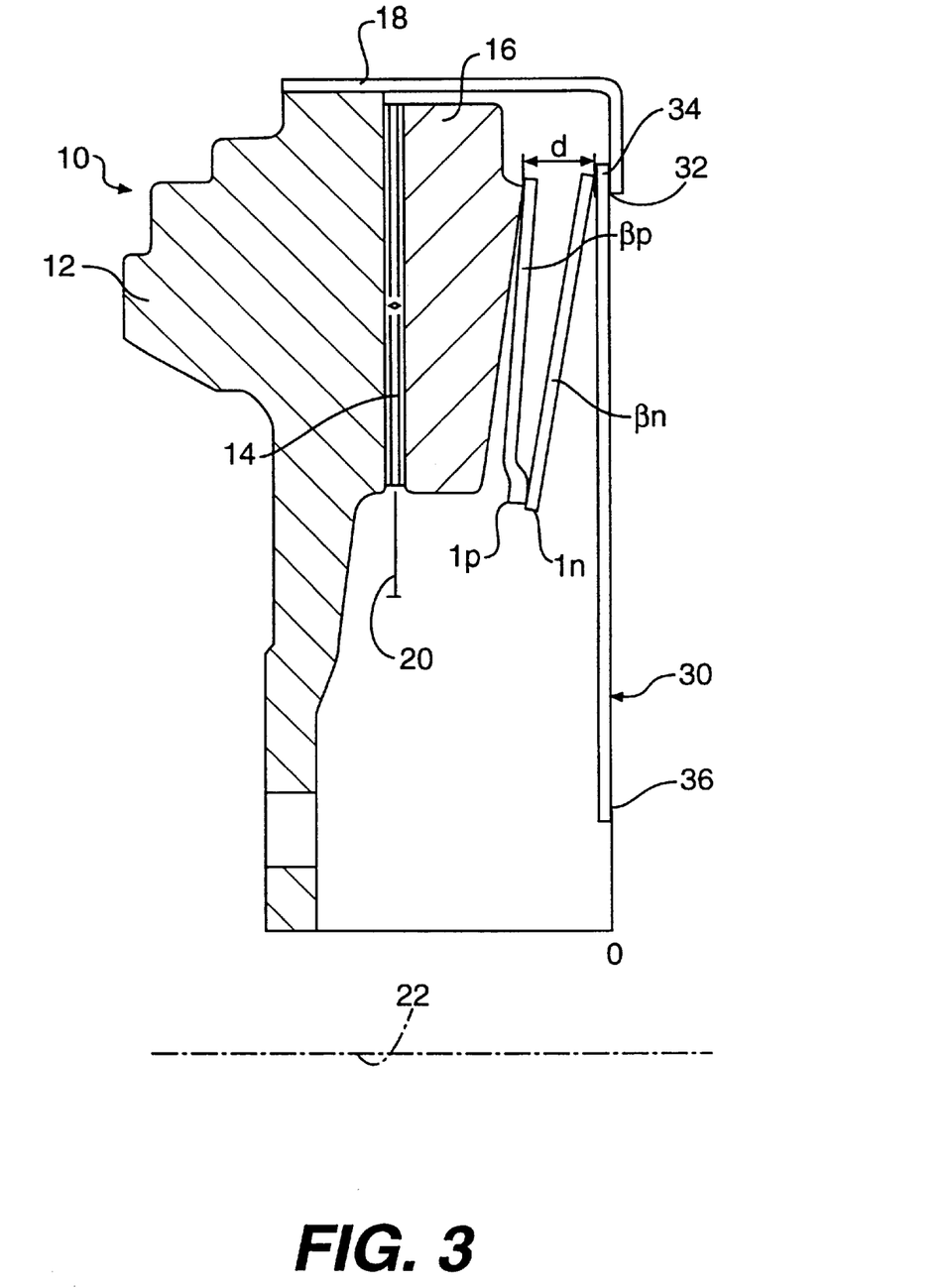
FIG. 3 is a largely schematic fragmentary cross-section illustrating an automotive clutch embodiment with worn friction discs in a closed, torque transmitting condition.
Figure 4:
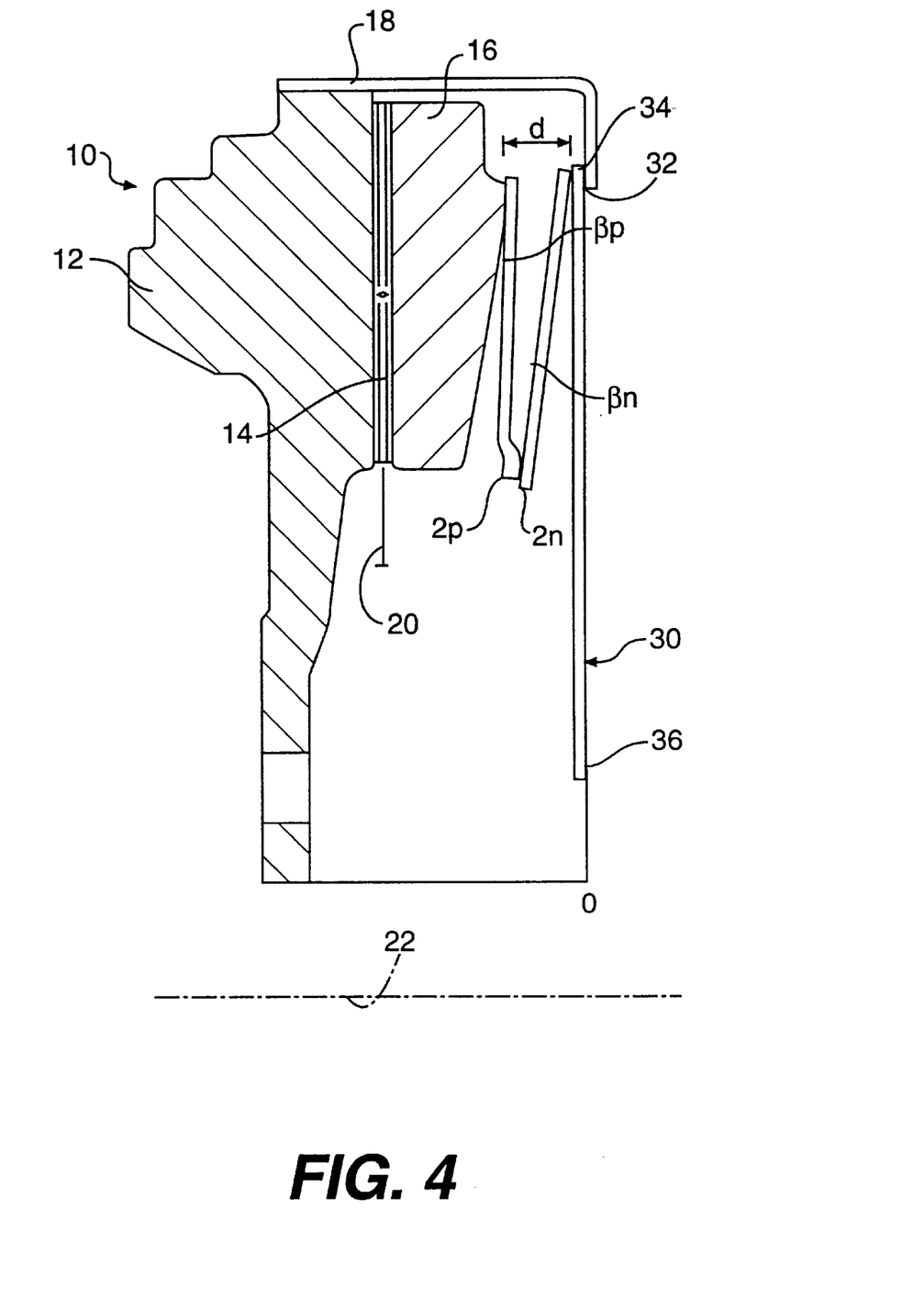
FIG. 4 is a schematic fragmentary cross-section illustrating an automotive clutch identical to that shown in FIG. 3 except that it includes a new or full-width friction disc pad in a closed torque transmitting condition.

In the embodiment illustrated in FIGS. 3–7, a positive Belleville spring Bp and a negative Belleville spring Bn, are arranged end for end in series to provide the loading force by which the pressure plate 16 is forced against the clutch disc 14 and the flywheel 12 to maintain the clutch 10 in a closed torque transmitting condition as shown in FIGS. 3 and 4. Each of the springs Bn and Bp has an axial length, the sum of the axial lengths of the two springs being included in a total length d. In FIG. 3, the total length d is the outside spacing of the Belleville springs at the outer diameters thereof, and can be defined only after the two springs are assembled. Also, when the two springs are assembled, one or both may be pre-stressed to fit a given axial space equal to the total length d. Because the friction linings of the clutch disc 14 shown in FIG. 3 are worn, the total length d represents the approximate maximum distance in which the Belleville springs operate to generate a closing force on the pressure plate. The total length d will vary during operation of the illustrated clutch in a manner to be described in more detail below.

Figure 7:
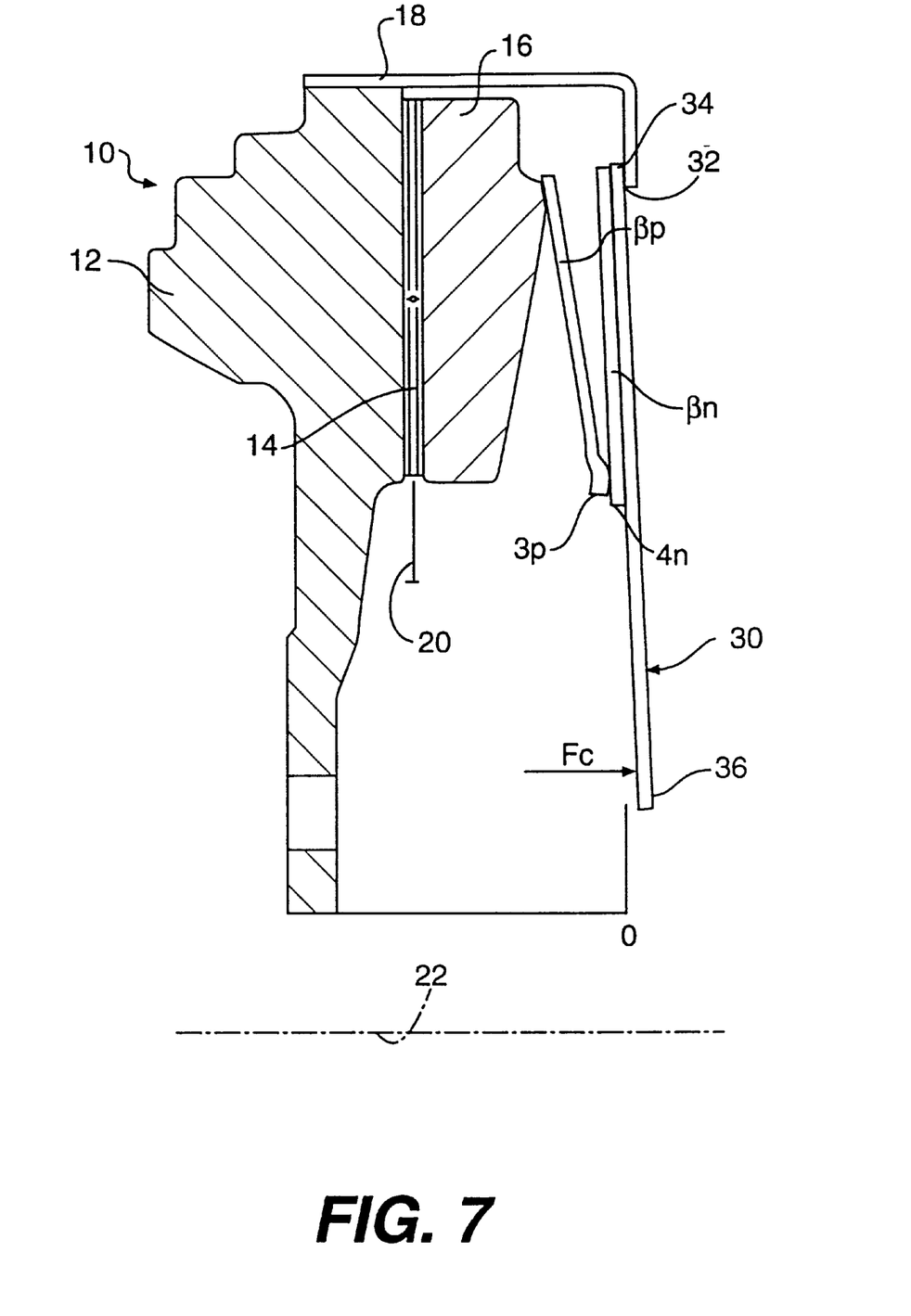
FIG. 7 is a schematic fragmentary cross-section illustrating the clutch of FIG. 4 in a fully opened or disengaged condition.
Figure 8A:
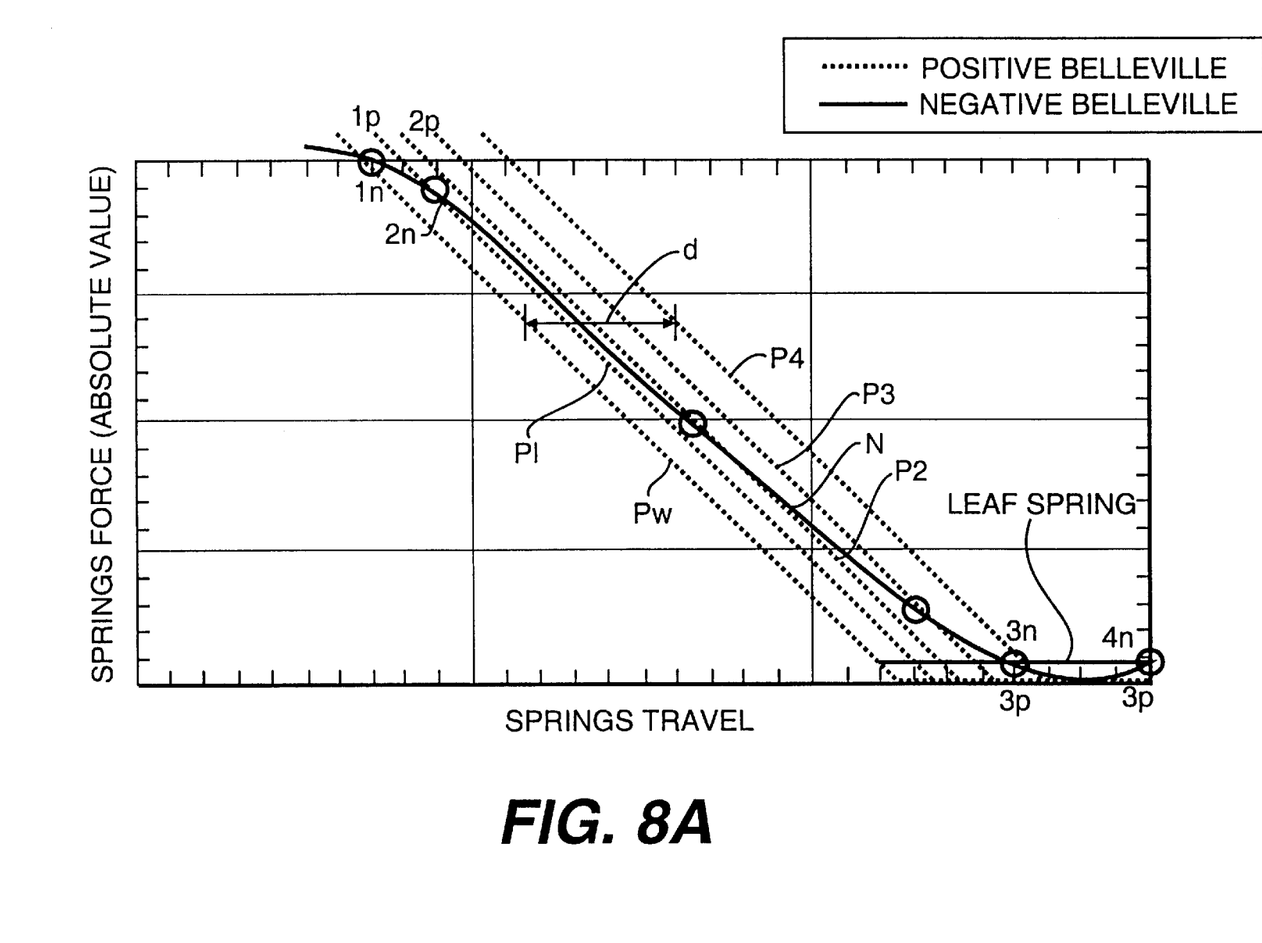
FIG. 8A is a graph showing curves representing spring travel versus spring force during actuation of the clutch shown in FIGS. 1–7.

In accordance with the present invention, the negative Belleville spring has a negative force/deflection ratio related to the positive force/deflection ratio so that the positive spring and the negative Belleville spring may reach a state of equilibrium substantially throughout range of actuating force extending between minimum and maximum values. In FIG. 8A, the several linear dashed line curves Pw, P1, P2, P3 and P4 represent the same positive Belleville spring Bp to reflect absolute values of force at different points of intersection with the single solid line curve representing the negative Belleville spring Bn. In particular, units of force on the ordinate of the curves are absolute values of force. The units on the abscissa of the curves, however, are units of spring travel resulting from relative values of defection of the positive and negative springs. The horizontal distance between each two of the dashed lines represents a variation in the total length d. The points of intersection are points where the positive and negative Belleville springs reach equilibrium and represent the force applied to the clutch disc 14. The points 1p,1n–4p,4n represent states of equilibrium between the respective Belleville springs during the several conditions of clutch operation between the fully engaged condition of FIGS. 3 or 4 to the fully released clutch condition in FIG. 7. In particular, the point 3n,3p represents a minimum value in a range of actuating force extending to a maximum value at the point 2p,2n for a clutch disc 14 with new or unworn friction linings or to a maximum value at the point 1p,1n for a clutch disc 14 with worn friction linings. From these curves, it will be seen that the maximum applied force remains substantially constant for both a worn clutch disc (point 1p,1n) and a new clutch disc (point 2p,2n) since these points lie near the top of the curve C in FIG. 2, for example.

More importantly, because of the related design parameters of the positive and negative springs Bp and Bn, particularly the force/deflection ratio relationship, both application and release of the actuating force exerted between the load represented by the pressure plate 16 and the reaction represented by the back plate 18 can be controlled by changes in the total length d. Such control of the actuating force may be appreciated by reference to FIG. 8A. The force/deflection ratio of the positive Bp, as indicated, results in the slope of the linear dashed line curves Pw and P1–P4. Because the total length of the springs Bn and Bp undergo deflection or change of length in the application of the actuating force throughout its range between minimum and maximum values without change in the force/deflection ratio of the positive spring Bp, the multiple dashed line curves represent increments of change in the total length d. Thus, assuming an initially relaxed condition of the positive spring Bp at the point 3p, and further that the positive spring Bp and the negative spring Bn are, by design, in a state of equilibrium at the point 3n,3p on the line P4, the slightest change in the total length d will upset that state of equilibrium and cause the two springs to find a new state of equilibrium. Now, assuming that the total length d is slightly increased, because of the opposite signs (i.e., positive and negative) of the force/deflection ratios of the two springs, they reach a new state of equilibrium by transfer of energy from the negative Belleville spring Bn to the positive spring Bp. With continued increase in the total length d, energy release from the negative Belleville spring Bn continues with continued storage of energy in the positive spring Bp until increase in the total length d stops, and the two springs reach a final state of equilibrium, for example, at the maximum value of the range of actuating force represented in FIG. 8A by the point 2p,2n for a new or unworn clutch disc 14.

Conversely, when the total length d of the two springs Bp and Bn is decreased, energy transfer to reach successive states of equilibrium is from the positive spring Bp to the negative Belleville spring Bn. Thus, returning the springs to a state in which the positive spring is again relaxed or unloaded will effect a controlled release of the actuating force to the minimum value of its range.

In accordance with the present invention, means for varying the total length of the springs, for controlling the actuating force while maintaining the springs substantially in a state of equilibrium throughout the actuating force range between the minimum and maximum values, is provided.

Figure 9:
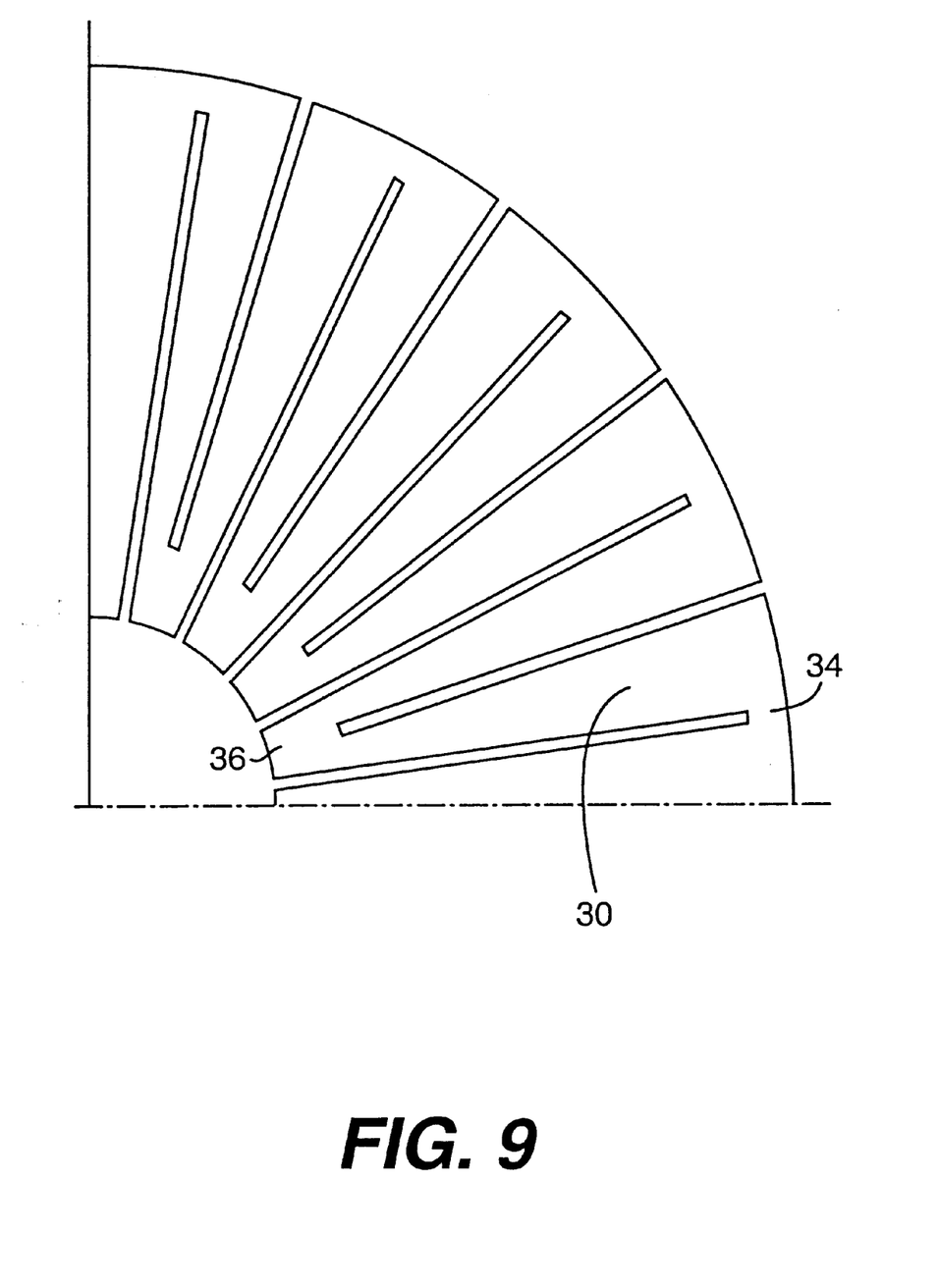
FIG. 9 is a fragmentary elevation of a control lever for the clutches of FIGS. 3–7.

In the embodiment illustrated in FIGS. 3–7, a slotted annular lever, shown in FIG. 9, is positioned between the outer periphery of the negative Belleville spring Bn and the back plate 18 in a manner to pivot axially about an inner peripheral edge 32 of the back plate 18. The lever 30 is thus provided with a short outer arm 34 and a relatively long inner arm 36 to which a control force Fc is applied.

In FIGS. 3–7, respectively, the various conditions of actuation of the clutch 10 are shown. Thus, in FIGS. 3 and 4, as described above, the clutch 10 is in a completely closed condition in which a full torque load is transmitted between the flywheel and output portion 20 of the clutch disc 14. The total length d of the springs Bp and Bn in FIG. 3 for a worn clutch disc 14 corresponds with the point 2p, 2n of FIG. 8A. The total length d of the springs Bp and Bn in FIG. 4 for a new clutch disc 14 corresponds with the point 1p, in of FIG. 8A. The total length d of the springs Bp and Bn between the respective conditions illustrated in FIGS. 3 and 4, is reduced by an increment represented in FIG. 8A by horizontal distance between the two linear curves Pw and P1.

Figure 5:
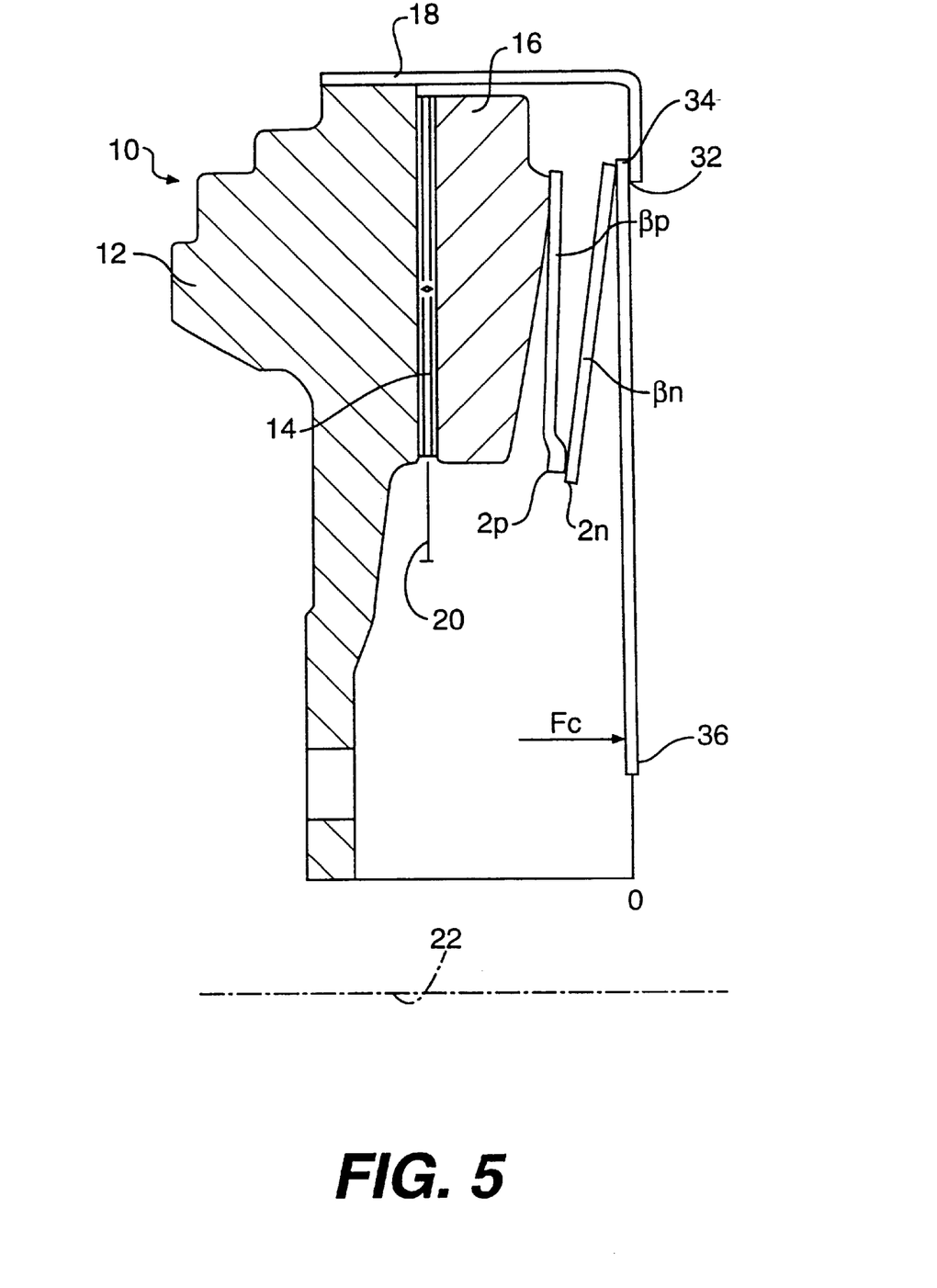
FIG. 5 is a schematic fragmentary cross-section showing the clutch of FIG. 4 in a condition during initial application of a clutch release or disengaging force.
Figure 6:
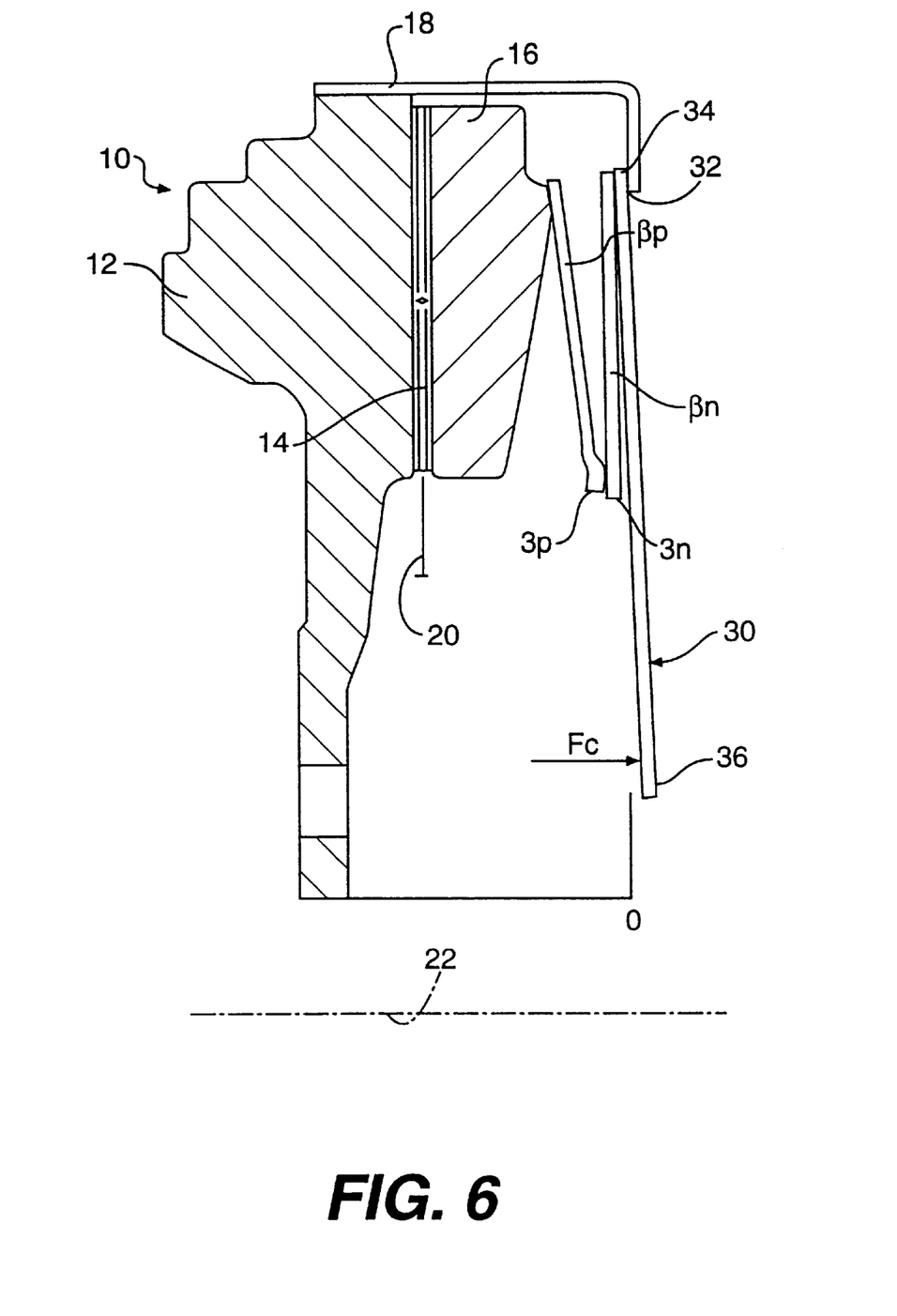
FIG. 6 is a schematic fragmentary cross-section showing the clutch of FIG. 4 near the end of a clutch release operation.

FIG. 5 illustrates the condition of the components in the clutch 10 at the initiation of a release of the actuating force when the friction linings on the clutch disc 14 are fully clamped between the pressure plate 16 and the flywheel 12. A force Fc is applied to the inner arm 36 of the lever 30 to initiate a shortening movement of the total length d. FIGS. 6 and 7 illustrate progressive application of the force Fc and corresponding axial travel of the lever 30 to effect release of the clutch to its open condition.

Figure 10:
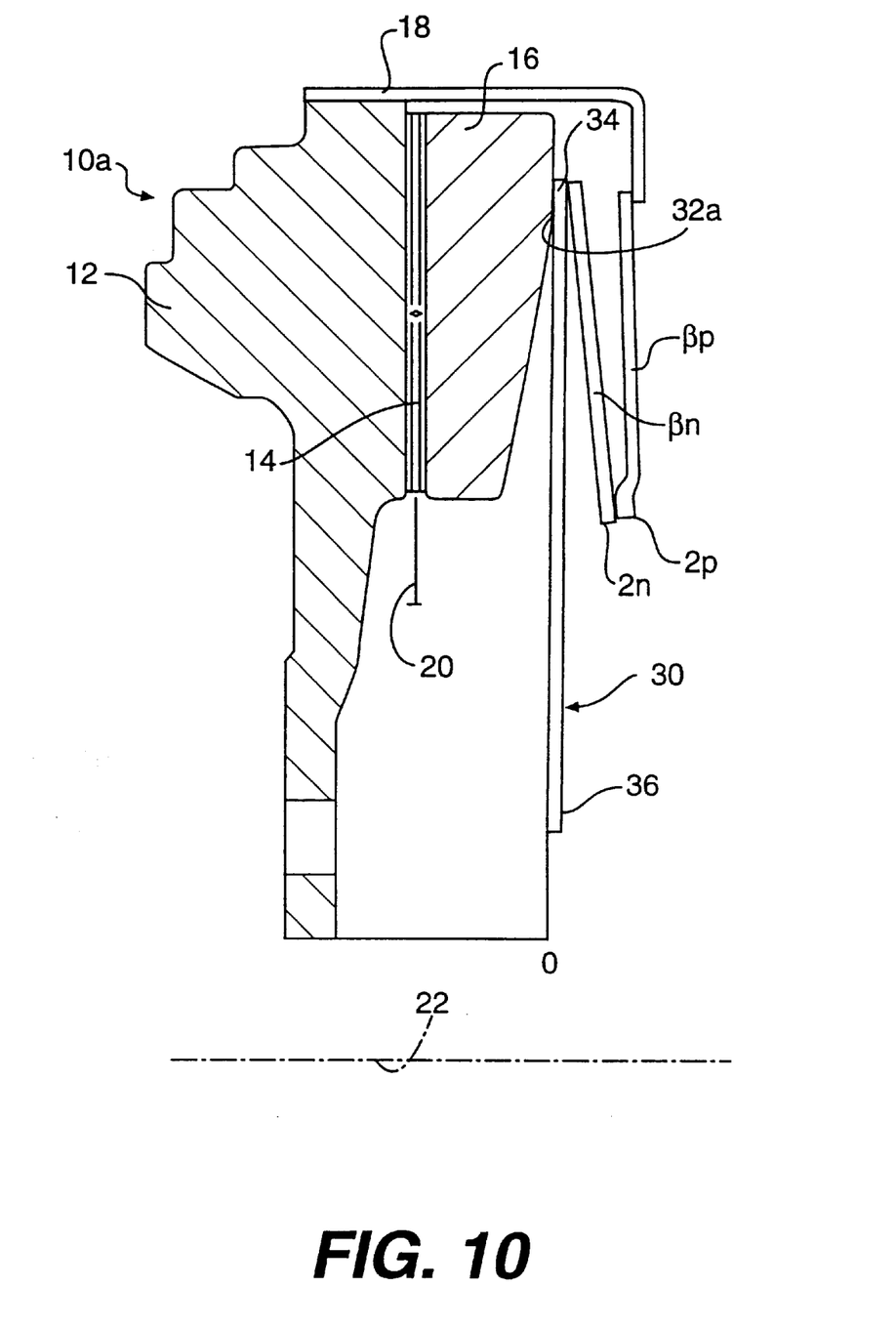
FIGS. 10 and 11 are schematic fragmentary cross-sections illustrating an alternative form of the clutch shown in FIGS. 3–7
Figure 11:
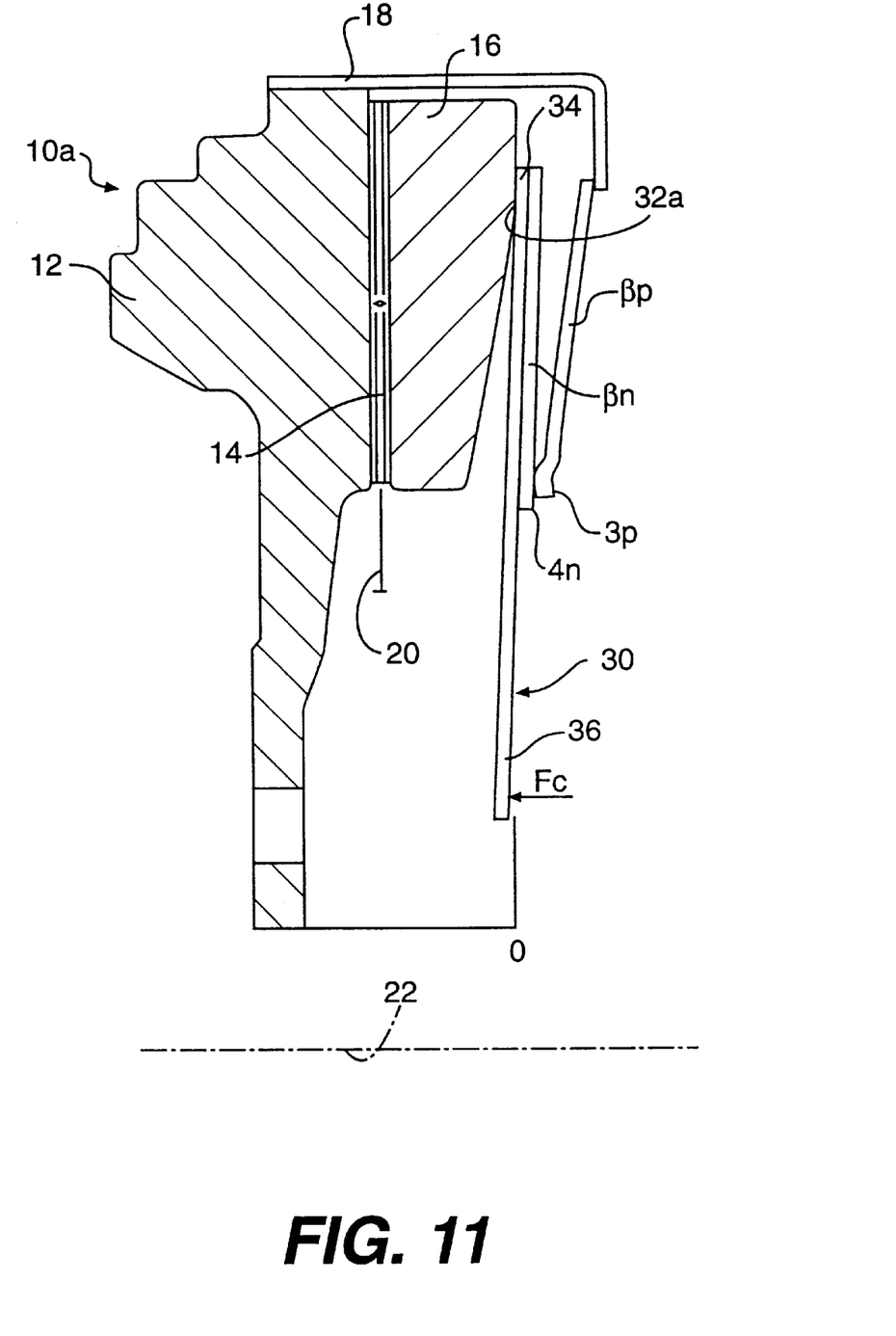

In FIGS. 10 and 11, an alternative embodiment 10a of the clutch described above is illustrated in which the lever 30 is pivoted on a fulcrum point 32a on the back of the pressure plate 16 and the position of the positive and negative Belleville springs Bp and Bn is reversed. It will be appreciated that application of the force Fc as shown in FIG. 11 will operate to vary the total length d in essentially the same manner as the embodiment described in FIGS. 3–7.

From the foregoing description, it will be appreciated that the relative positions of the positive and negative springs Bp and Bn can be reversed from that shown in the drawings so that the springs will engage each other at their outer peripheries. The positions of the springs may also be reversed between that shown in FIG. 3 and that shown in FIG. 10. Thus, the spring Bp may engage the back plate 18 and the spring Bn may engage the pressure plate 16 without substantially affecting operation of the actuating system. This also applies to the embodiment illustrated in FIG. 10.

In the force actuator system having a positive spring and a negative Belleville spring with the respective force/deflection ratios represented in FIG. 8A, the closed condition of the clutch 10 or 10a is maintained at the maximum total length d with the lever 30 in a state of rest with the control force Fc=0. In an automotive clutch application, this characteristic is both conventional and important because application of a control force is required as wanted only to disengage the clutch. Moreover, this operating characteristic is achieved by the embodiments described because the force/deflection ratio of the positive spring Bp is of an absolute value greater than the absolute value of the negative force/deflection ratio of the negative Belleville spring Bn. Because of this relationship, any decrease in the total length d will cause energy transfer from the positive spring Bp to the negative Belleville spring Bn and that energy transfer will stop only when the two springs reach a state of equilibrium by application of a control force Fc (i.e.,Fc<0).

In contrast to the automotive clutch application, friction brakes conventionally require the application of a control force, such as the depression of a foot pedal, for example, to develop normal forces between friction components that operate very similarly as the friction components of a clutch. In accordance with the present invention, controlled application of normal forces in a friction brake is provided by a force applicator having essentially the same structural organization as that described and illustrated for a clutch, but differing in the relationship of the positive and negative force/deflection ratios of the respective positive and negative springs.

Figure 8B:
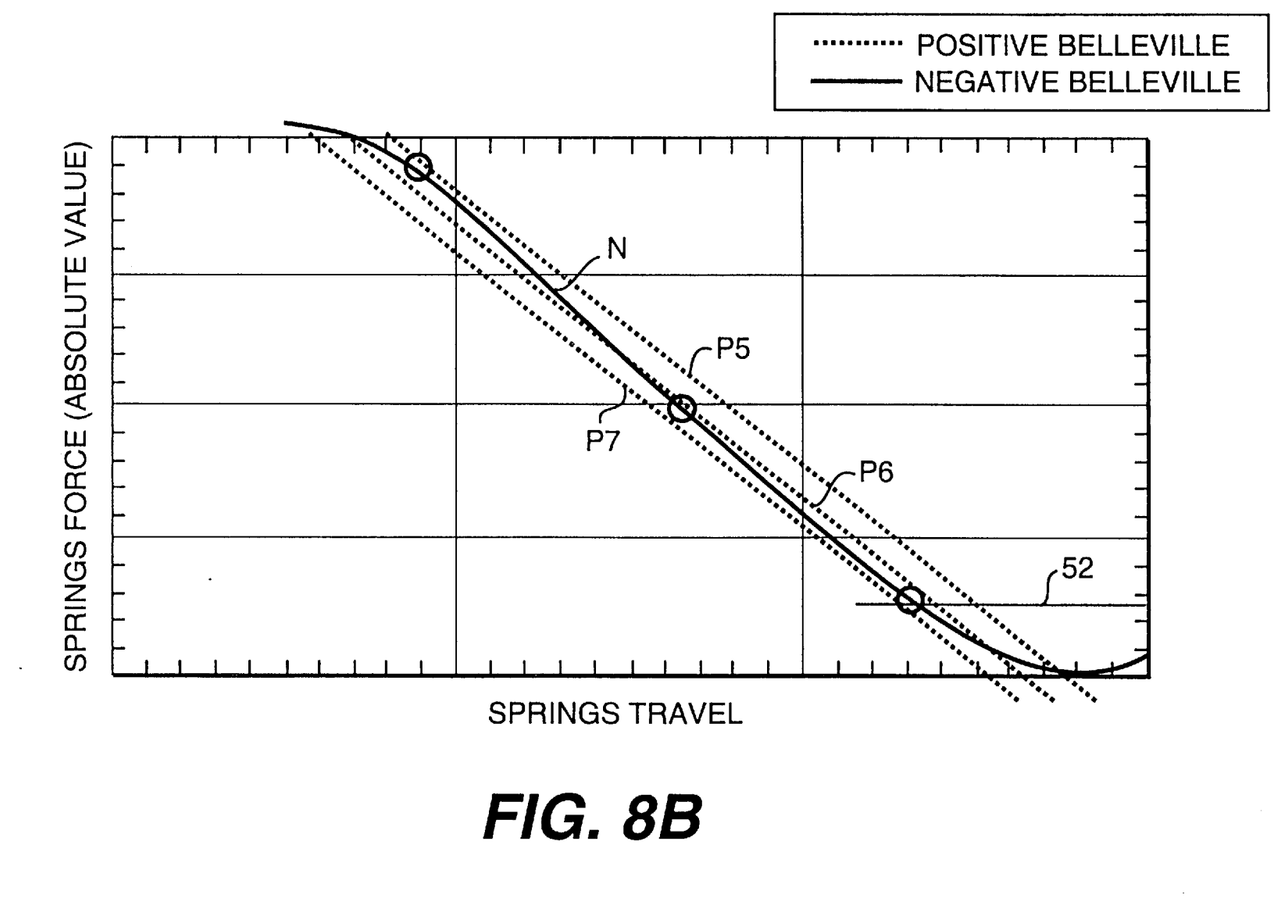
FIG. 8B is a graph similar to that of FIG. 8A but representing modified spring force/deflection ratios.

In FIG. 8B, the force/deflection ratio of the positive spring Bp is again represented by the dashed-line curves P5, P6 and P7, and that of the negative Belleville spring Bn by the solid line Na, using the same conventions as those of FIG. 8A. Points at which the springs reach equilibrium are designated E1, E2 and E3 in FIG. 8B. In FIG. 8B, however, the absolute force/deflection ratio of the positive spring Bp is less than that of the negative Belleville spring Bn. As a result, the positive and negative force/deflection ratios will cause the springs to reach a state of equilibrium at a minimum applied force when the total length d is maximum. That is, decreasing the total length will cause the two springs to seek equilibrium in a direction from the point E1 at the minimum end of the applied force range to the point E3 at the maximum end of the applied force range. Thus, by changing the force/deflection relationship of the two springs Bp and Bn, and in the context of the described clutches 10 and 10a, the application of a control force Fc to the lever 30 would reverse the operation of the actuator to open and close the described clutches if the springs Bn and Bp had the force/deflection relationship of FIG. 8B. While this reversal is not wanted in an automotive clutch, it demonstrates application of the force actuator of the present invention to a friction brake in which application of a control force results first in the application of a minimum applied normal force and proceeds to a maximum applied normal force with continued application of the control force to reduce the length d.

Figure 12:
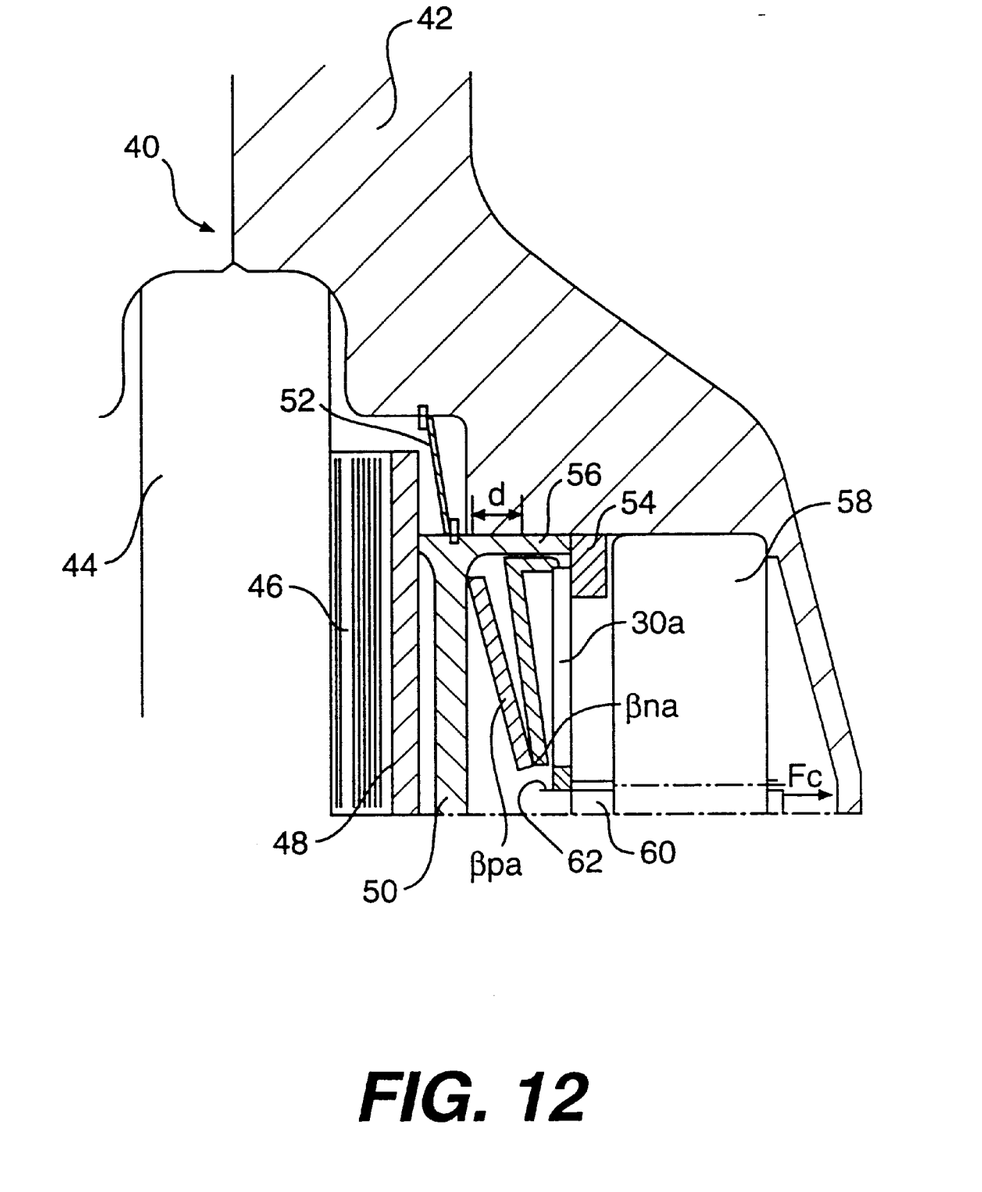

In FIG. 12, the controlled force actuator of the present invention is used in a disc brake 40 having a caliper 42 and a disc 44 releasably engaged by a friction pad 46 secured to a backplate 48. The disc 44 is rotatable relative to the caliper 42 and the backplate with the friction pad 46 are secured against rotation relative to the caliper 44 in accordance with well known disc brake construction and operation. A piston 50 is slidable axially in the caliper 42 toward the back plate 48 against the return bias of a canceling spring 52. A ring 54 is fixed in the caliper and defines a fulcrum at its inner periphery for a lever 30a of the construction shown in FIG. 9. The outer end of the lever 30a engages the outer edge of a negative Belleville spring Bna through a spacer 56. A positive Belleville spring Bpa is located between the piston 50 and the negative Belleville spring Bna. A linear motor 58 is anchored against axial displacement in the caliper 42 and is operable to advance a central threaded shaft 60 axially in opposite directions with respect to the caliper 42. The shaft 60 carries a radial stopper ring 62 which engages the inner end of the lever 30a.

As explained above, operation of the brake 40 is essentially the same as operation of the clutch embodiments described, except that the springs Bpa and Bna have the force/deflection relationship shown in and described above with reference to FIG. 8B. The motor 58 operates the lever 30a to decrease the total length of the springs Bpa and Bna and apply normal force to the brake pad 46 and the disc 44. The canceling spring 52 will retract the pad away from the disc when the springs pass under a condition of minimum applied force. This function of the canceling spring 52 is represented in FIG. 8B by the horizontal line 52.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A controlled force actuating system to apply and release an actuating force between a load member and a reaction member, comprising:

an energy storing positive spring and an energy storing negative Belleville spring arranged in series between the load member and the reaction member to exert a range of actuating force on the load member varying between minimum and maximum values, the positive spring having a length and a positive force/deflection ratio and the negative Belleville spring having a length and a negative force/deflection ratio related to the positive force/deflection ratio so that the positive spring and the negative Belleville spring is capable of reaching a state of equilibrium substantially throughout the range of actuating force, the positive spring and the negative spring presenting a total length including both the axial lengths of the respective positive and negative springs; and means for varying the total length of the springs for controlling the actuating force between the minimum and maximum values.

2. The controlled force actuating system of claim 1, wherein the means for varying the total length of the springs maintains the springs substantially in a state of equilibrium throughout the actuating force range.

3. The controlled force actuating system of claim 1, wherein the means for varying the total length of the springs comprises means operative between one of the positive and negative springs and one of the load member and the reaction member.

4. The controlled force actuating system of claim 3, wherein means for varying the total length of the springs comprises a lever.

5. The controlled force actuating system of claim 4, wherein the lever comprises an annular disc-shaped member.

6. The controlled force actuating system of claim 4, wherein the lever is operative between the negative spring and one of the load member and the reaction member.

7. The controlled force actuating system of claim 6, wherein the lever is operative between the negative spring and the load member.

8. The controlled force actuating system of claim 6, wherein the lever is operative between the negative spring and the reaction member.

9. The controlled force actuating system of claim 1, wherein the positive force/deflection ratio as an absolute value is greater than the negative force deflection ratio as an absolute value.

10. The controlled force actuating system of claim 9 in combination with an automotive starting clutch having a rotatable pressure plate for applying a range of normal force against a clutch disc and a back plate rotatable with the pressure plate, and wherein the pressure plate is the load member and the back plate is the reaction member.

11. The controlled force actuating system of claim 1, wherein the positive force/deflection ratio as an absolute value is less than the negative force deflection ratio as an absolute value.

12. The controlled force actuating system of claim 11 in combination with a friction brake having a rotatable brake disc, a non-rotatable pressure plate for applying a range of normal force against the brake disc, and a non-rotatable caliper, and wherein the pressure plate is the load member and the caliper is the reaction member.

13. The controlled force actuating system of claim 1, wherein at least one of the positive and negative spring is pre-stressed.

14. The controlled force actuating system of claim 13, wherein both of the positive and negative spring are pre-stressed.

15. The controlled force actuating system of claim 1, wherein the means for varying the total length of the springs effects a release of stored energy from the negative Belleville spring to the positive spring.

16. The controlled force actuating system of claim 15, wherein the rate of energy release from the negative Belleville is substantially the same as the rate of energy storage by the positive spring.

17. The controlled force actuating system of claim 15, wherein the rate of energy release from the negative Belleville is greater than the rate of energy storage by the positive spring.

18. The controlled force actuating system of claim 15, wherein the rate of energy release from the negative Belleville is less than the rate of storage by the positive spring.

* * * * *